(12) United States Patent
Jiwani

(10) Patent No.: US 12,015,531 B2
(45) Date of Patent: Jun. 18, 2024

(54) METHOD FOR GENERATING A QUALITY OF EXPERIENCE (QOE) INDEX BY WAY OF ENSEMBLE OF EXPECTATION SCORES

(71) Applicant: GUAVUS, Inc., San Jose, CA (US)

(72) Inventor: Kuldeep Jiwani, Gurugram (IN)

(73) Assignee: GUAVUS, Inc., San Jose, CA (US)

( * ) Notice: Subject to any disclaimer, the term of this patent is extended or adjusted under 35 U.S.C. 154(b) by 371 days.

(21) Appl. No.: 17/541,432

(22) Filed: Dec. 3, 2021

(65) Prior Publication Data

US 2023/0179493 A1     Jun. 8, 2023

(51) Int. Cl.
*H04L 41/5067* (2022.01)
*H04L 41/142* (2022.01)
*H04W 24/10* (2009.01)

(52) U.S. Cl.
CPC ........ *H04L 41/5067* (2013.01); *H04L 41/142* (2013.01); *H04W 24/10* (2013.01)

(58) Field of Classification Search
CPC ............... H04L 41/5067; H04L 41/142; H04L 41/5009; H04W 24/10
See application file for complete search history.

(56) References Cited

U.S. PATENT DOCUMENTS

| | | | |
|---|---|---|---|
| 7,646,715 B2 | 1/2010 | Oueslati et al. | |
| 10,902,368 B2 | 1/2021 | Rajasekaran et al. | |
| 10,915,602 B2 | 2/2021 | Nagarajan | |
| 10,949,750 B2 | 3/2021 | Thornton et al. | |
| 11,012,458 B2 | 5/2021 | Wright et al. | |
| 11,115,273 B2 | 9/2021 | Lapiotis et al. | |
| 2010/0191503 A1* | 7/2010 | Pecht | G06F 11/008 702/179 |
| 2013/0182578 A1* | 7/2013 | Eidelman | H04L 43/0876 370/241 |
| 2013/0182700 A1* | 7/2013 | Figura | H04L 43/04 709/224 |
| 2018/0247239 A1 | 8/2018 | Horrell et al. | |
| 2020/0084087 A1* | 3/2020 | Sharma | H04W 24/08 |

(Continued)

FOREIGN PATENT DOCUMENTS

| | | |
|---|---|---|
| CN | 103327556 A | 7/2013 |
| JP | 2020-047503 | 3/2020 |

*Primary Examiner* — Kenneth T Lam

(57) ABSTRACT

A method provides telecom operators a single Quality of Experience (QoE) index to collectively interpret service experience and network experience by way of ensemble of expectation scores. The method includes the steps of mapping Key Performance Indicators (KPIs) of time-series data into multiple probability spaces of statistical expectation functions thereby producing time-series expectation scores; applying vector geometry to said time-series expectation scores for each of said statistical expectation functions thereby producing an N-Dimensional probability vector; normalizing correlations of said N-Dimensional probability vector across said KPIs thereby producing a normalized N-Dimensional probability vector; and generating a N-Dimensional probability distribution from the normalized N-Dimensional probability vector to produce an ensemble function. The ensemble function is then be applied to time-series data thereby producing an ensemble index, which represents the QoE (Quality of Experience).

17 Claims, 18 Drawing Sheets

(56) References Cited

U.S. PATENT DOCUMENTS

| | | | |
|---|---|---|---|
| 2020/0285997 A1 | 9/2020 | Bhattacharyya et al. | |
| 2020/0382361 A1* | 12/2020 | Chandrasekhar | G06N 3/044 |
| 2021/0266781 A1* | 8/2021 | Alkurd | H04L 41/0823 |
| 2022/0043703 A1* | 2/2022 | Hwang | G06T 11/206 |
| 2022/0167236 A1* | 5/2022 | Melodia | H04B 17/15 |
| 2022/0382833 A1* | 12/2022 | Riddle | G06F 17/18 |

* cited by examiner

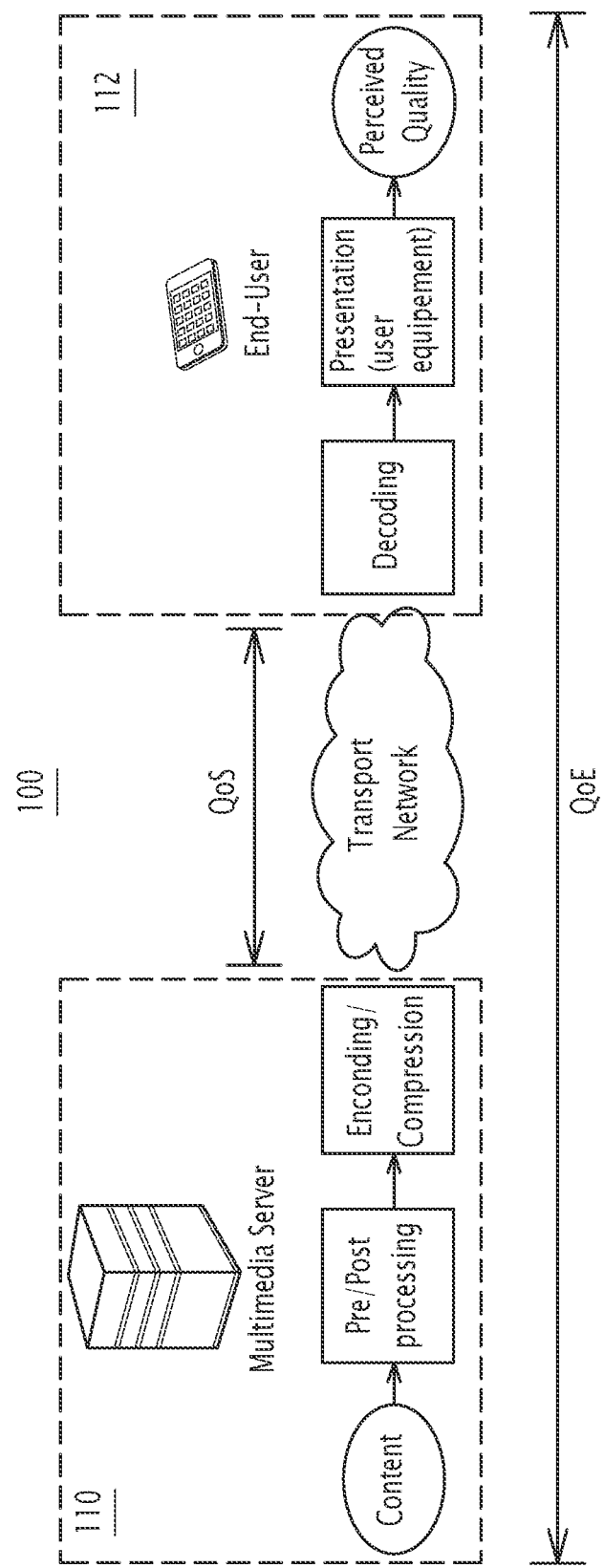
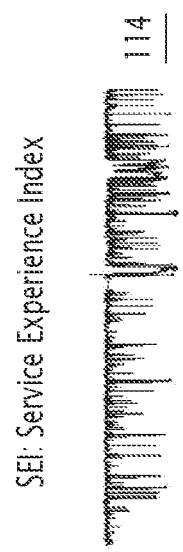
Fig. 1A
Fig. 1B

200

650

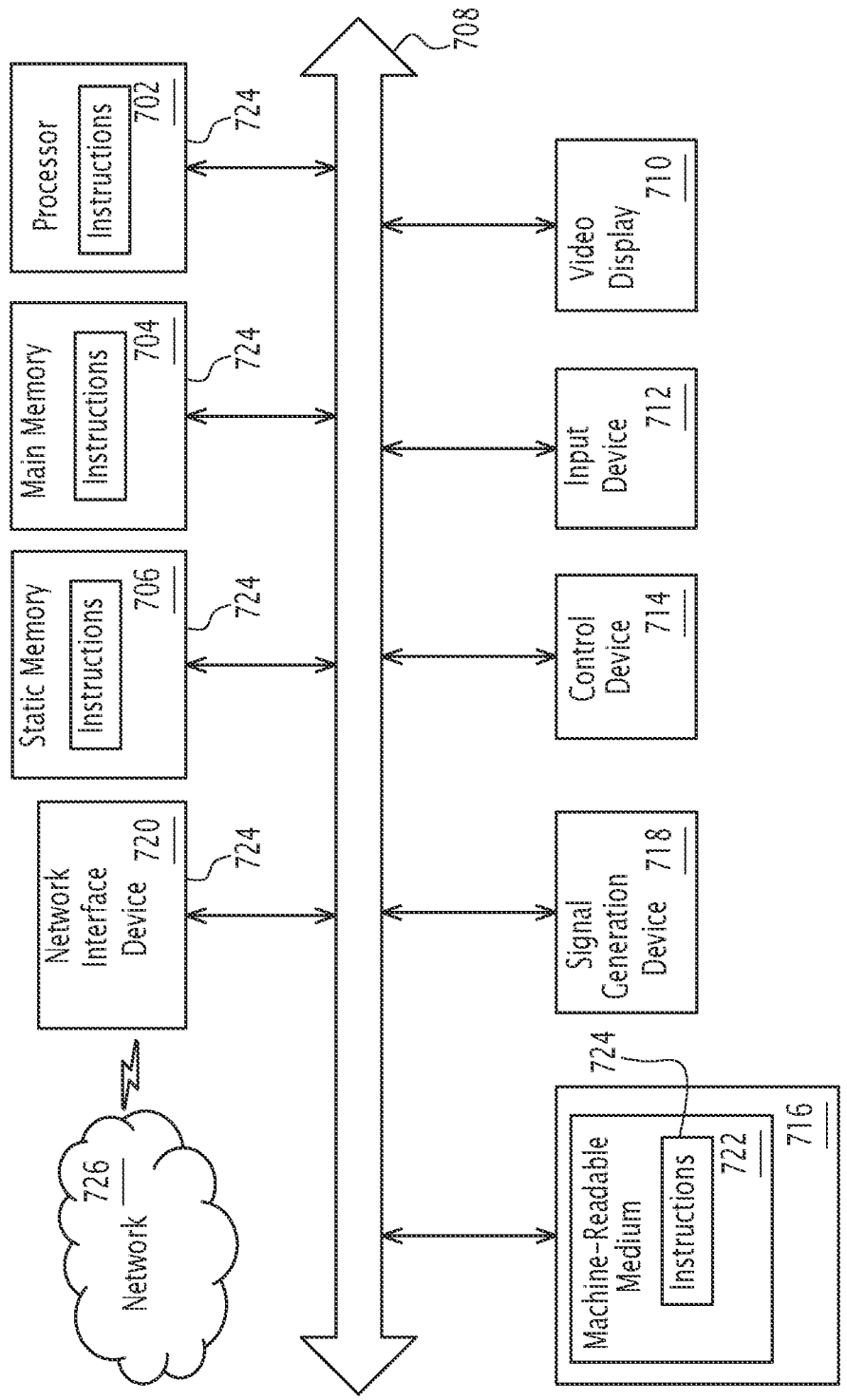

METHOD FOR GENERATING A QUALITY OF EXPERIENCE (QOE) INDEX BY WAY OF ENSEMBLE OF EXPECTATION SCORES

BACKGROUND

Field

One or more embodiments of the invention relate generally to the field of telecommunication network analytics. More particularly, embodiments relate to analyzing and reporting operational aspects of network performance and user delivery services from a telecom operator's perspective.

Introduction

The 5th Generation (5G) mobile network is the next step in the evolution of mobile technology that connects virtually anyone and everything, including objects, devices, and computers. The 5G wireless technology promises multi-gigabit per second peak data rates, vast network bandwidth, increased reliability, ultra-low latency, and a more consistent user experience to many users.

Network reliability, availability, and quality of service (QoS) play an important role in the current success of service delivery. As Communications Service Providers plan their 5G network rollout and new 5G services, customer experience and service quality of experience (QoE) will be the primary differentiating factor. The existing network problem resolution methods based on an aggregated view of network quality is insufficient to deal with the complex operations of the higher quality and data throughput networks.

Intermittent network problems frustrate users, affect productivity levels, overwhelm Information Technology teams, and can be difficult for network administrators to solve. There are many problems that can affect network performance, and many of them are very complex to identify and understand. Further it can be difficult for Information Technology teams to assess user experience from the user's perspective. Communications Service Providers need a better tool to view network service quality to leverage their operational data to support new services, and satisfy their customer expectations and user experiences.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 1A illustrates a use-case diagram for visualizing Quality of Service (QoS) in a telecom network;

FIG. 1B illustrates a Quality of Service (QoS) index over time in a telecom network;

FIG. 6B depicts a projection of two distributions and corresponding discriminant boundaries for visualizing a reason to normalize distances there between;

FIG. 7 depicts an exemplary diagrammatic representation of a machine suitable for use to perform the methods in accordance with an embodiment.

DETAILED DESCRIPTION

Figure 2A:
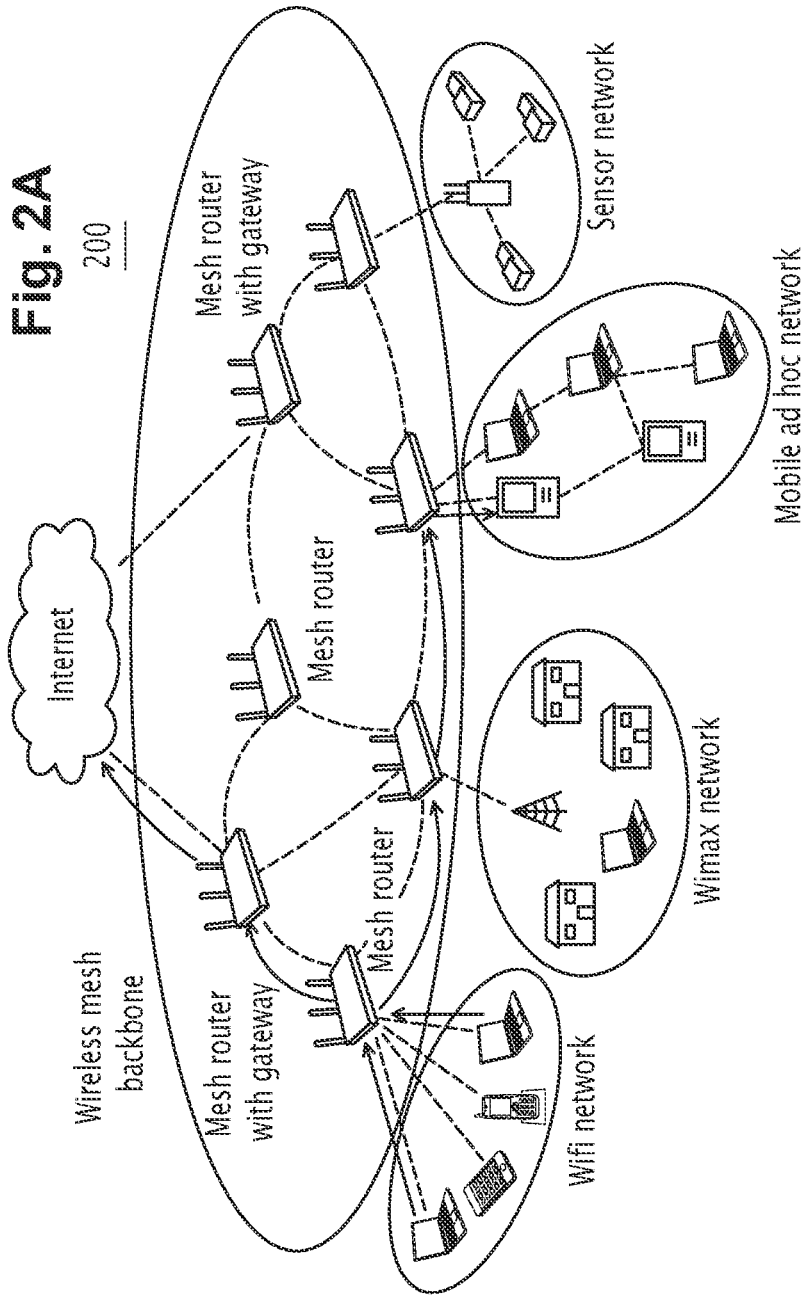
FIG. 2A illustrates a use-case diagram for visualizing Quality of Network (QoN) in a telecom network.

While the specification concludes with claims defining the features of the invention that are regarded as novel, it is believed that the invention will be better understood from a consideration of the following description in conjunction with the drawing figures, in which like reference numerals are carried forward.

In any telecommunication network one of the most important business problems is to ensure all services are running as per the expected usage patterns. Any possible deviations from expected pattern are a signal that something is changing in network. This could be either due to some operational faults or due to some traffic routing changes, or change in user demand patterns, etc. Any such changes, if caught at an early stage, can provide sufficient time to the telecom operator to plan for some prospective fault, prospective load unbalance due to route changes, prospective change in demand, etc. Early addressing of these issues can significantly reduce the operational maintenance cost, ensure higher customer satisfaction, and use available resources in an optimal way.

Figure 2B:
FIG. 2B illustrates a Quality of Network (QoN) index over time a telecom network.

FIG. 1A illustrates a use-case diagram 100 for visualizing Quality of Experience (QoE) and Quality of Service (QoS) in a telecom network. For example, a multimedia server 110 provides media to an end-user by way of a mobile device 112. The quality of the content depends on many factors, some related directly to the underlying device (e.g., content format, pre/post-processing, and encryption/decryption), and some related to the network (e.g. transport, packet loss, interference, etc.). FIG. 1B illustrates a Quality of Service (QoS) index 114 over time a telecom network, which for example, provides a level of the experience for the service. FIG. 2 illustrates a use-case diagram 200 for visualizing Quality of Network (QoN) in a telecom network, whose performance also affects the quality of service and thus the overall quality of user experience. FIG. 2B illustrates a Quality of Network (QoN) index 116 over time a telecom network, which for example, provides a level of the experience for the network performance.

Figure 2C:
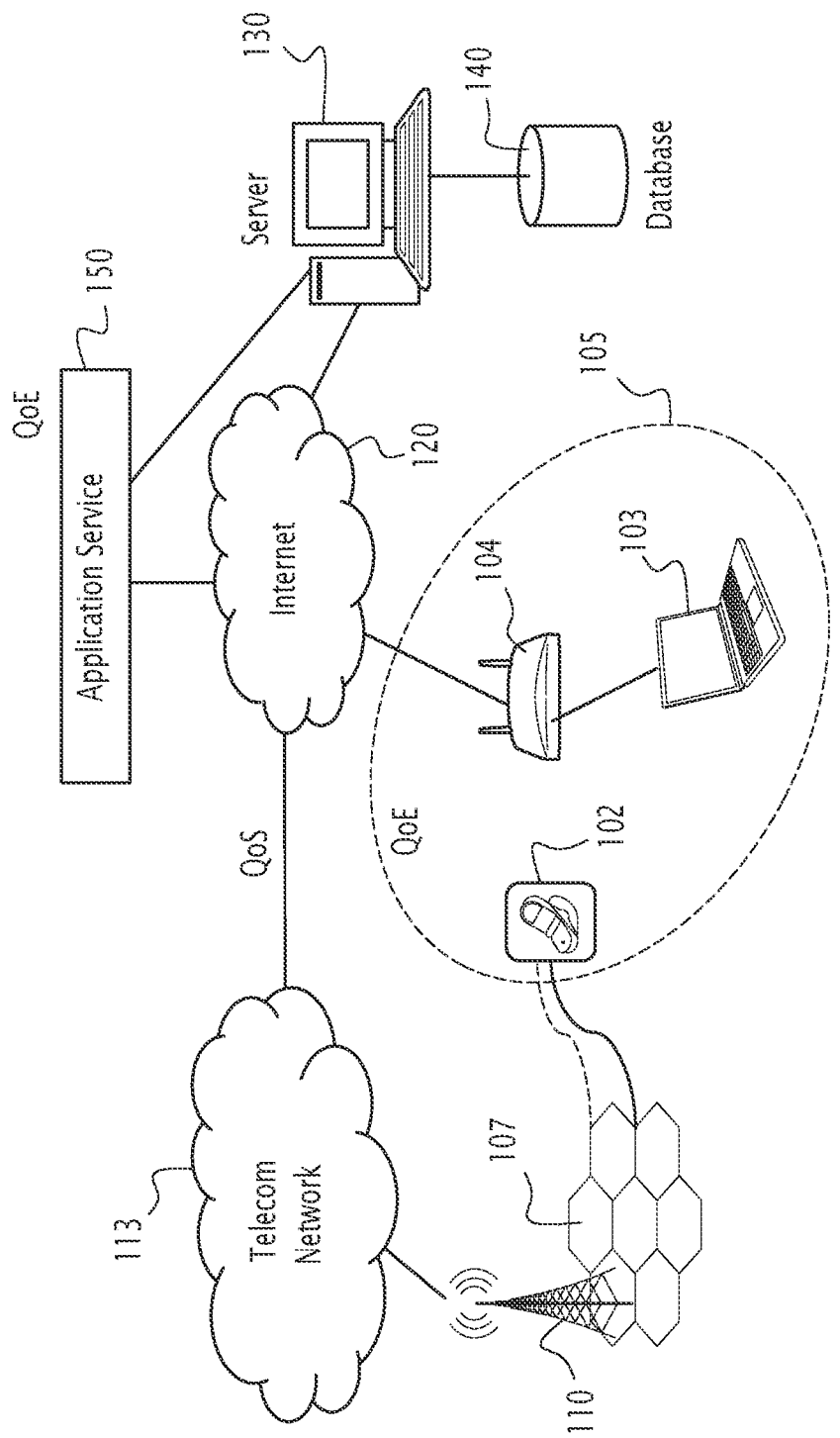
FIG. 2C illustrates a communication environment.

Referring to FIG. 2C, a communication environment 250 is shown. The communication environment includes a telecommunication network 113 and an internet communication environment 120. The telecommunication network 113 can provide a mobile communication link via base receiver 110 for wireless connectivity of a mobile device 102 from one or more cells 107. In one arrangement, the mobile device 102 can communicate over a Radio Frequency (RF) link with the base receiver 110 using a standard communication protocol such as legacy 2G (CDMA, GSM) and 3G, or recent LTE 4G and 5G. The base receiver 110, in turn, can connect the mobile device 102 to the Internet 120 over a packet switched link. The internet can support application services and application service layers 150 for providing media or content to the mobile device 102. The mobile device 102 can establish connections with a server 130 on the network and with other mobile devices for exchanging information. The server 130 can have access to a database 140 that is stored locally or remotely and which can contain profile data. The server can also host application services directly, or over the Internet 120. The Quality of Experience (QoE) is applicable at the mobile device 102 layer, and the application service layer 150. The Quality of Service (QoS) is more applicable to the network experience index across the communication networks. Although examples are provided for video applications, the QoS is applicable to other services such as audio, text messaging, gaming, social interaction applications, and the like.

The mobile device 102 can also connect to the Internet over a Wi-Fi or WLAN 105. Wireless Local Access Networks (WLANs) provide wireless access to the mobile communication environment within a local geographical area. WLANs can also complement loading on a cellular system, so as to increase capacity. Wi-Fi is the wireless technology used to connect computers, tablets, smartphones and other devices to the internet. Wi-Fi is the radio signal sent from a wireless router to a nearby device, which translates the signal into data for the user of the mobile device 102. Wi-Fi is a family of wireless network protocols, based on the IEEE 802.11 family of standards, which are commonly used for local area networking of devices. WLANs are typically composed of a cluster of Access Points (APs) 104 also known as base stations. The mobile communication device 102 can communicate with other WLAN stations such as a laptop 103 within the base station area 105. In typical WLAN implementations, the physical layer uses a variety of technologies such as IEEE 802.11 technologies. The physical layer may use infrared, frequency hopping spread spectrum in the 2.4 GHz or 5 GHz Band, or sequence spread spectrum. The mobile device 102 can send and receive data to the server 130 or other remote servers on the mobile communication environment. In one example, the mobile device 102 can send and receive audio, video, or other multimedia content from the database 140 through the server 130. Similarly, the QoE is applicable to the wi-fi and WLAN contexts and can me evaluated for video, audio, text messaging, gaming, social interaction applications, and other multimedia services.

Figure 3A:
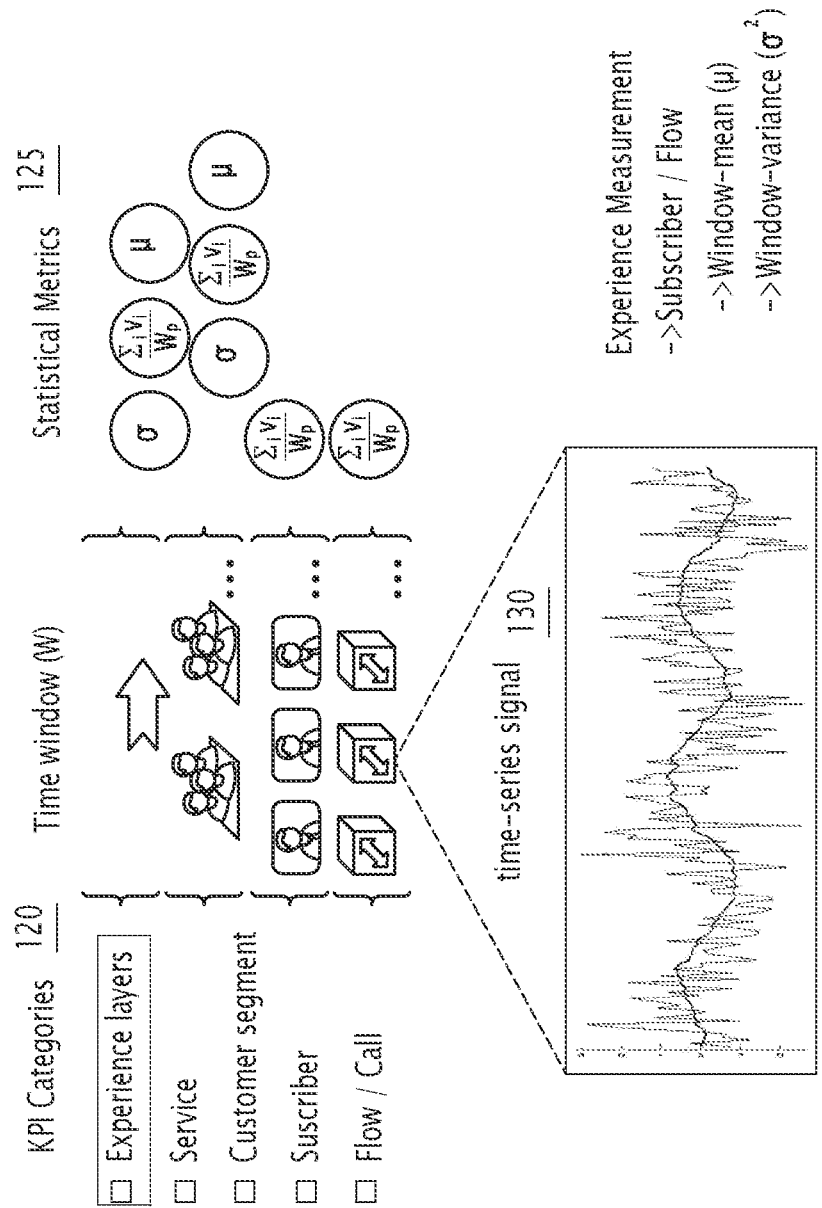
FIG. 3A illustrates an operator's perspective of a telecom network in visualizing Key Performance Indicators (KPIs) related to network performance and user experience.

FIG. 3A illustrates an operator's perspective of a telecom network for visualizing Key Performance Indicators (KPIs) 120 related to network performance and user experience. KPI categories 120 include, for example, experience layers, service, customer segment, subscriber, flow and calls. Each of these category indicators are of critical importance (hence, "key performance indicators"). They are commonly collected and represented as time-series data, for example, time-series signal 130. KPI data can also be presented as tabular information or in other formats (e.g., numerical values in spreadsheets, forms, or databases). For this example, each of these time-series signals 130 can be analyzed separately from a statistical viewpoint for each domain, and where each analysis provides certain metrics 125 (e.g., mean $\mu$, standard deviation $\sigma$, variance $\sigma^2$, etc.). The statistical characteristics of a KPI are often specific to a particular domain. To fingerprint the behavior of various telecom services from a holistic viewpoint, one needs to measure the expected behavior across the multiple KPIs 120, which can include these metrics 125 for example. These patterns generally vary across services, which at times are hundreds in number. It turns into an exercise of tracking thousands of KPIs for assessing the overall expected operations of the telecommunications network.

Figure 3B:
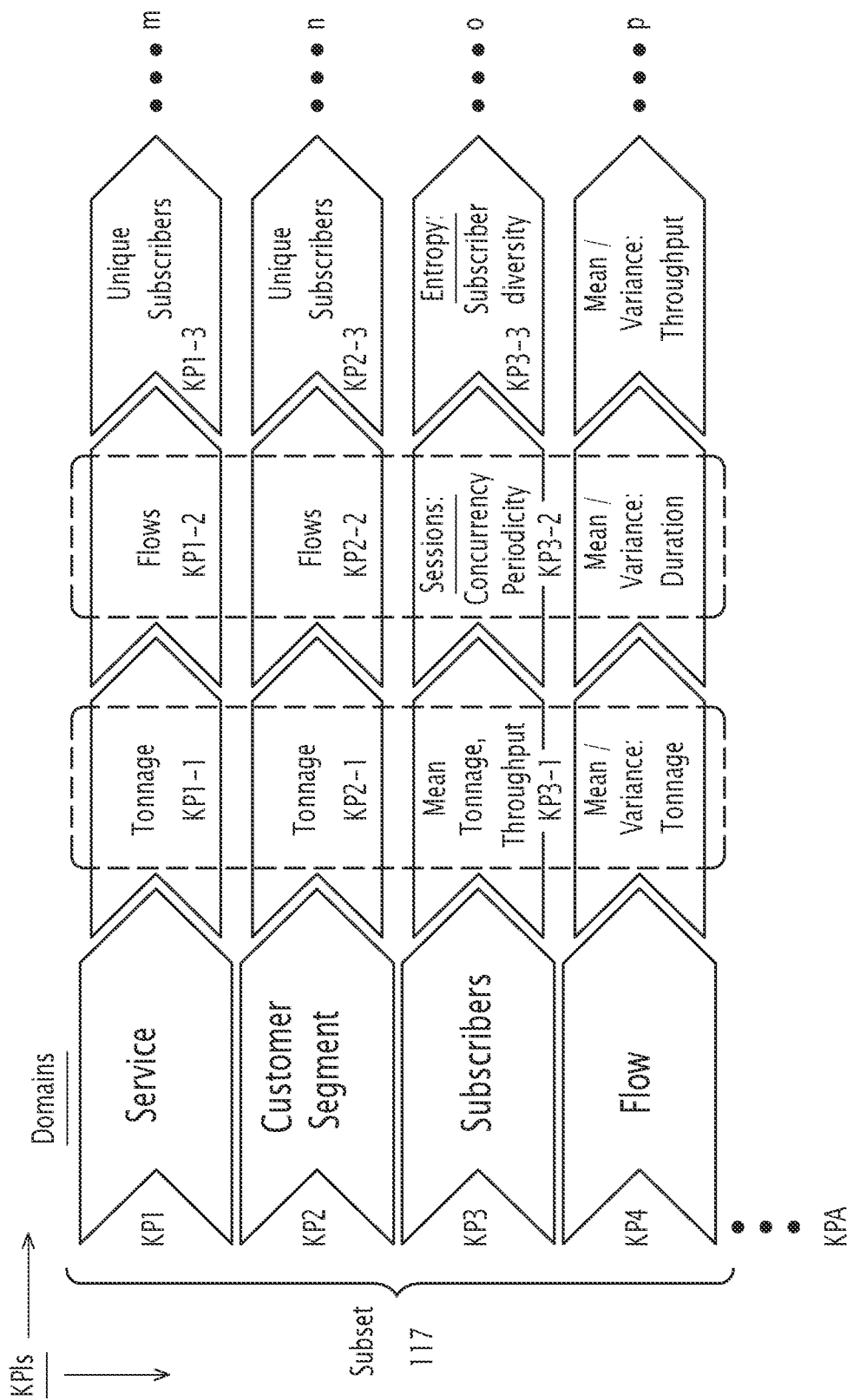
FIG. 3B depicts domains of a telecom network that each provide a source of multiple Key Performance Indicators.

FIG. 3B depicts domains of a telecom network that each provide a source of multiple Key Performance Indicators (KIPs). For example, the Service domain can include m number of KPIs alone (e.g. KP1-1, KP1-2, ... KP1-m). Each domain may have more or less than another domain. For example, the Customer Segment domain can include "n" number of KPIs similarly. A time-series data is particular to a KPI, wherein a KPI is particular to a domain, the domain being at least one among Service, Customer Segment, Subscriber and Flow. A subset (set) 117 of all KPIs can be collected for specific categorization and analysis and/or where the entire domain is unavailable. Time-series data can include any one or more of tonnage data, flow data, subscriber data, data throughput data, concurrency data, periodicity data, variance data duration data, or diversity data. The extent of the domains is the number of available domains, for example, the number "A" where KPA denotes the $A^{th}$ domain. To combine the findings of all the KPIs, various statistical measures like mean, sum, max, min, etc. are used to summarize the information content in the data. Such methods are however only able to capture a specific view of data and are not able to solve the general use case individually in one KPI across the domain. As mentioned above KPIs are commonly presented as time-series data.

If one takes the mean ($\mu$) of all KPIs then it will represent the score of majorities. But if for instance, some 5 out of 100 KPIs are anomalies, then the average (mean) will still reflect a good indication of network performance; the majority view is not anomalous. On the other hand, if one picks a statistical measure like max or min, then they capture the information of extreme data points, but will miss the trend for majority of data. Therefore, in short no single statistical measure can holistically capture all different kinds of information. Moreover, when we have correlated KPIs then any statistical aggregation such as mean etc., will be a biased mean towards the correlated group and misrepresent the actual information. This is where the need to capture various kinds of network domain issues through a single index arises.

Figure 3C:
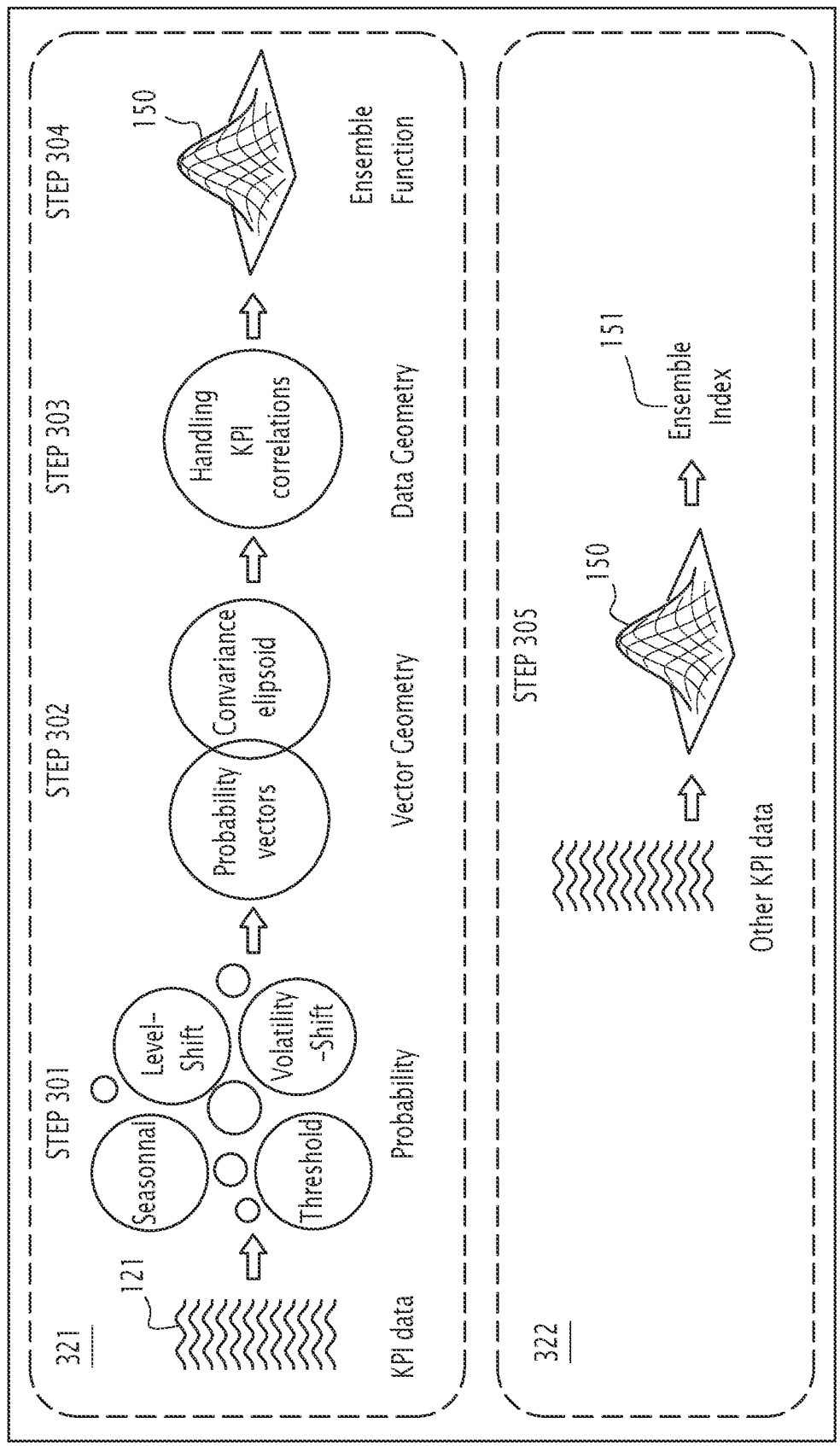
FIG. 3C depicts a method of generating an ensemble index and associated statistical expectation functions for analyzing statistical metrics of certain time-series signal types in accordance with an embodiment.

FIG. 3C depicts a method 300 of generating an ensemble index 151. By way of the method 300, Network Operations Center (NOC) analysts can track a handful of index KPIs to assess the overall health and proper functioning of the entire network. They can get the context from raw KPIs as and when needed without worrying about if the concise information of that specific KIP is reliable, because they can retrieve that information from raw KPIs when needed; it remains available for refined analysis. The method solves the problem of representing the expected behavior on an entire network via a single index, along with the ability to reflect minor and major changes simultaneously. The method steps 301-305 together produce an ensemble index 151 of KPI data. In certain circumstances, the method 300 can be separated to two parts; part 321 (steps 301-304), which collects, analyzes and estimates seen time-series data in order to generate an ensemble function 150; and part 322 (step 305; occurring at a later time/date), which collects "other" time-series data (e.g., not seen/used previously in part 321) and provides an ensemble index 151 of the "other" data (for making a classification decision) based on the ensemble function in part 321 captured/created at an earlier time.

The method 300 provides telecom operators a single Quality of Experience (QoE) index (Ensemble Index 151) to collectively interpret service experience (and network experience by way of ensemble of expectation scores. The method comprising the steps of: (301) mapping Key Performance Indicators (KPIs) of time-series data into multiple probability spaces of statistical expectation functions thereby producing time-series expectation scores; (302) applying vector geometry to said time-series expectation scores for each of said statistical expectation functions thereby producing an N-Dimensional probability vector; (303) normalizing correlations of said N-Dimensional probability vector across said KPIs thereby producing a normalized N-Dimensional probability vector; and (304) generating a N-Dimensional probability distribution from the normalized N-Dimensional probability vector to produce an ensemble function 150. The term "normalized" is described ahead and provides a means for auto handling of correlation amongst KIP's.

The ensemble function 150 is then be applied (305) to the same, or other, time-series data thereby producing an ensemble index 151. That index 151 represents the QoE (Quality of Experience) for the ensemble of expectation scores that helps the telecom operators interpret for the combined: service quality index 114 and network experience index 116. "Other" data refers to data other than that used for creating the ensemble function. For example, other data can be collected at a different time that that data used in the calculation of the ensemble function according to method 300.

Method 300 provides a unique solution that compiles complex information collected from multiple domains into an easy to interpret index. Whereas current methods and means require a large investment of time and resources, the method 300 helps the telecom operators to detect issues earlier and more effectively over a large network. The main highlights are mapping KPIs into continuous variable probability space, then the process of combining all of them by taking care of all cross-correlations, highlighting a variety of issues. Application of the method to multiple KPIs across multiple domains of the telecom network results in one index that captures all available information in a novel and efficient way that solves complex large-scale problems.

Figure 3D:
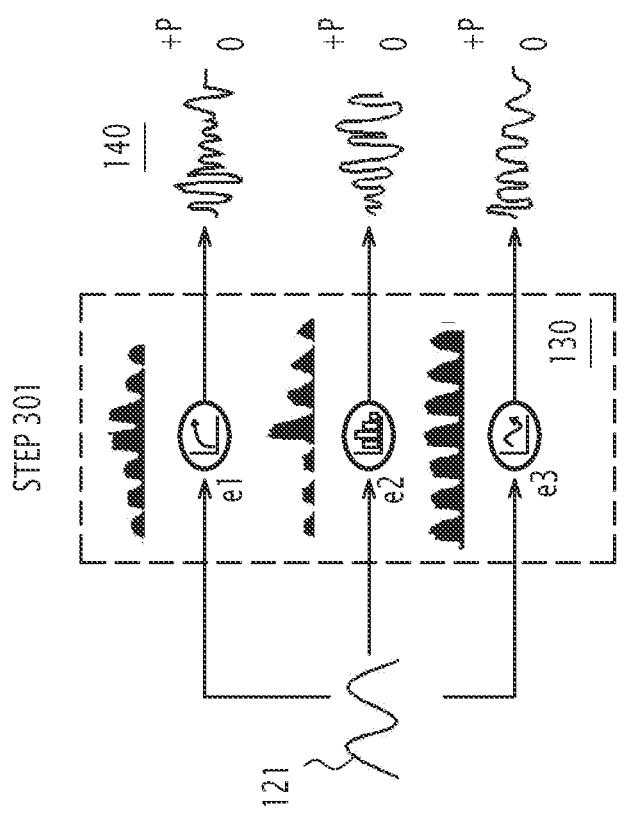
FIG. 3D illustrates various expectation function metrics applied to time-series signals of a KPI(s) in accordance with an embodiment.

FIG. 3D illustrates various expectation function metrics applied to time-series signals of a KPI(s) in accordance with an embodiment. One key feature of method 300 is that a KPI is transformed to multiple continuous probability time series, which helps in analysis of the KPI from multiple statistical angles at the same time. Thus, one need not manually analyze the time series to check which algorithms will be more suitable. An operator can just run a list of all possible algorithms (e.g., expectation functions 130) that could be useful for such time series data and the ensemble model will automatically weight the right KPIs. Therefore, it helps in automating the entire process and is highly beneficial when operators are presented with a large number of KPIs. One of the innovative aspects of the method is how the KPIs are combined via an ensemble model that shows the effect of all individual statistical functions (e.g., expectation functions 130). It resolves a wide variety of majorly and minorly represented issues encountered in statistical KPI analytics. Moreover, it decorrelates data metrics that would otherwise skew a probabilistic decision. In this way, the methodological approach to analyzing numerous KPIs across various domains is not being biased by correlated KPIs, which are seen often in real world data.

Figure 3E:
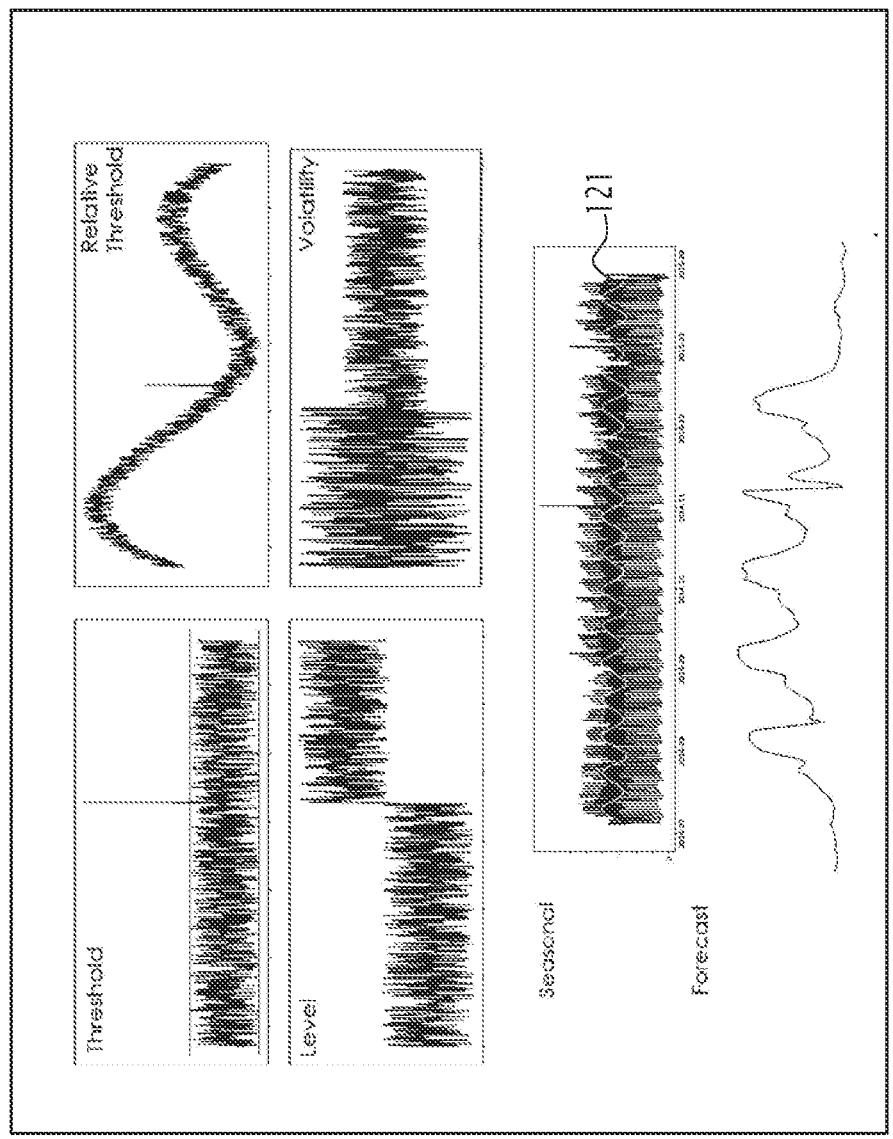
FIG. 3E illustrates various expectation function metrics applied to time-series signals of a KPI(s) in accordance with an embodiment.

For instance, step (301) of method 300 for mapping Key Performance Indicators (KPIs) includes applying at least one said statistical expectation function 130 (e.g. e1, e2, e3, etc.) to said time-series data thereby producing an expectation score 140 time-series for each said KPI. The statistical expectation functions 130 comprise one among a threshold, a relative spike, a level shift, a volatility shift, a seasonal shift, a trend, a seasonal variance and a forecast; others not shown are similarly applicable. FIGS. 3D and 3E illustrates various expectation functions applicable to time-series signals 121 of a KPI(s) in accordance with an embodiment. As illustrated, the expectation score time-series is bounded from zero (0) to a positive number (+P), where a zero score represents a value that is closest to an expected value and a higher positive number (+P) represents a magnitude of deviation from the expected value.

The list of expectation function to apply are the following:

Threshold
  The expectation is that the values remain bounded in a range, with a distribution centered around the mean $\mu$ with std. deviation $\sigma$ ∘ Threshold_$f(x) = \text{abs}\left(\frac{(x - \mu)}{\sigma}\right)$ Relative threshold or Spike
  The expectation is that the change in consecutive values remains bounded in a range
  The raw series is first converted into a abs delta series and then Threshold_f(x) is applied on it Level Shift
  The expectation is that the level of the time-series doesn't change beyond an expected range
  Two equal sized windows are chosen around every point and both window's mean is computed
  Then at every point the difference of both window's means is computed
  On top of this series the function Threshold_f(x) is applied to obtain scores Volatility Shift
- The expectation is that the variance of the time-series doesn't change beyond an expected range
- Two equal sized windows are chosen around every point and both window's std. deviation is computed
- Then at every point the difference of both window's std. deviation is computed
- On top of this series the function Threshold_f(x) is applied to obtain scores Seasonal
- The expectation is that for a particular time of day, the values remain in a bounded range with respect to the time in consideration
- A seasonal pattern is fitted across the data based upon FFT analysis of series
- Residuals are computed from the expected seasonal pattern and the actual data
- On top of this residual series the function Threshold_f (x) is applied to obtain scores Trend
- The assumption is that the data has an upward or downward trend, the expectation is that data values are following that trend with respect to time
- A regression line is fitted over data to estimate the properties of the trend line
- Residuals are computed from the expected trend line and the actual data
- On top of this residual series the function Threshold_f (x) is applied to obtain scores Seasonal Variance
- The expectation is that for a particular time of day the values are near some central value and their variance lies in a bounded range with respect to the time in consideration
- A seasonal pattern is fitted across the data based upon FFT analysis of series
- Then the mean and variance are computed per time of day
- Residuals are computed from the expected seasonal pattern with variance accounted for
- On top of this residual series the function Threshold_f (x) is applied to obtain scores Forecast (statistical only)
- Based upon only statistical forecasting i.e., AR (Auto Regressive) or MA (Moving Average)
- A forecast model will be built, and a residual be computed from actual and forecasted value
- On top of this residual series the function Threshold_f (x) is applied to obtain scores However, simply aggregating the multiple expectation time-series scores 140 for producing a single expectation index alone has limitations. Statistical measures do not account for correlation. Statistics don't have differential treatment for inputs, all are treated equally. Understanding the effect of correlation amongst the various time-series data of each KPI is relevant to appreciating the inventive contribution of the method ahead. One inventive aspect of the embodiment by method 300 herein described is the auto-handling of correlations amongst KPIs. An understanding of data correlation and the effect on statistic metrics is in order next.

Briefly, we will use as example here the case of an operator trying to assess user safety in an airplane where certain statistical parameters of the windows have been reported. The operator wants to ensure the windows do not crack or break and put the user in jeopardy. Let's use a strength indicator $s_i$ (1-10) against atmospheric pressure per window $w_i$ of airplane. The mean of $\{s1, s2, s3, \ldots, sn\}$ would provide the average strength. But, if 3/100 have score below 2 and others above 8, then the average will not highlight the issue. Using the median of $\{s1, s2, s3, \ldots, sn\}$ provides a centrally popular strength. But, if 40/100 have score 0 and 60 have score 9, then issue of 40 weak strength will not be surfaced. If we use the minimum of $\{s1, s2, s3, \ldots, sn\}$, that metric will provide the weakest strength. But if 95/100 have score below 2, then minima will just highlight the issue and not its extremity.

None of these metrics (mean, median, minimum/maximum) incorporate correlation. If windows strength $s_i$ was available for 60 windows and the last value was copied for next 40 the Mean of $\{s_1, s_2, s_3, \ldots, s_n\}$ would be a biased average strength. The 40 correlated values will bias the mean towards the last value. In view of this example, we can then proceed to determine how to more productively interpret KPI data. KPI values in time-series data are scalars; they are single value points. They can be normalized/regularized/standardized to make them comparable. They can be summarized via statistical aggregations like {mean, median, min, . . . }. They will be memoryless and context-less. However, if we represent KPI probabilities as vectors, then KPI probability can be represented as a separate dimension in higher dimensional space. KPIs can be evaluated based on their own historical distribution & along with others. KPIs will be memory-full (based on distribution) and context-full (multi-variate analysis).

Statistics are limited to scalar operations. There is unexpected behavior when the average is beyond certain threshold, when data is biased by majority, or when statistics only capture majority anomalous cases and miss anomalies on less KPIs. In contrast, application of vector geometry to KPIs provides for ensemble metrics, which can more effectively identify unexpected behavior with respect to a N-dimensional probability space. Vector geometry can be employed to treat all dimensions independently, and can capture anomalies on less KPIs, as well as when majority anomalous.

Figure 4:
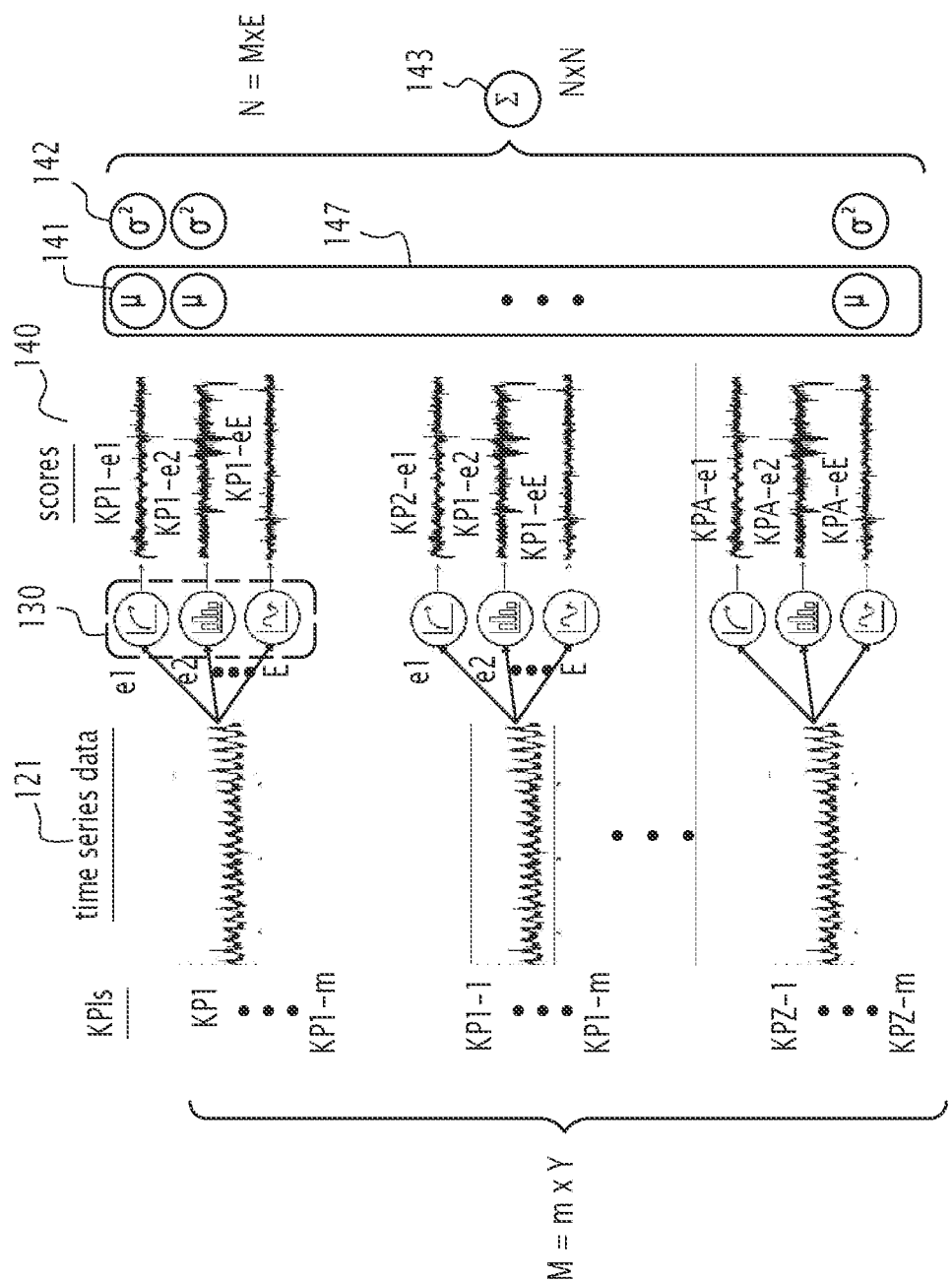
FIG. 4 illustrates the application of statistical expectation functions to various KPIs to produce expectation scores in accordance with an embodiment.

Method 300 introduces an ensemble approach to address these statistical limitations of step 301 and handle KPI correlations by way of vector geometry. The ensemble approach can first be understood by way of FIG. 4 illustrates application of the method 300 wherein the statistical expectation functions 130 above are applied to various KPIs time-series data 121 to produce expectation scores 140 in accordance with an embodiment. Recall, the first step 301 of method 300 was to convert each time-series data 121 of each KPI into another time-series of expectation scores 140. The method 300 applies multiple statistical expectation functions 130 on the same KPI to capture different kinds of expectations. So, the method generates multiple expectation time-series scores 140 for each KPI. Each expectation function 130 applies a specific statistical property on the time-series data, as was seen in FIG. 3D. The value of each data point is converted into a probability or likelihood value as per the expectation definition of the respective statistical expectation function 130 (e.g. e1, e2, e3; FIG. 3D-3F). The score is a Z-Score upon a probability distribution that is obtained by applying various statistical transformations. So, each statistical expectation function 130 generates a score that goes from 0 to a positive number (+P). Where 0 score represents the value that is closest to the expected value and the higher positive number (+P) represents the magnitude of deviation from the expectation.

After all expectation scores 140 are computed from all the configured expectation functions 130 for each KPI, method 300 then proceeds to step 302 at which time it combines all these scores without losing information in original series. To achieve this, the method transitions from scalar operations to a vector space, wherein the scores 140 obtained from all expectation functions 130 per KPI are considered as a dimension in a high dimensional space. So, in view of FIG. 4, if we have M KPIs and E expectation functions, then we have a vector with (M*E) dimensions. Let's use N=M*E then we would have vectors of shape (N×1). The advantage of moving to vector space is that each KPI can be treated independently, and its own historical distributions can be accounted for while computing the expectation probability of the current value. Method step 302 of applying at least one (e.g., e1) said statistical expectation function 130 produces a plurality of expectation score time-series 140 for a set of multiple KPIs, wherein the plurality of expectation score time-series is dimension E, the set 117 of multiple KPIs is dimension M; and the expectation score time-series comprises scalar terms.

A core assumption of applying expectation functions 130 is that data majorly adheres to various statistical expectations chosen for the dataset. Hence all the scores 140 are expected to stay around a low central value. Occasionally they may go higher whenever something unexpected happens. Thus, all these expectation score 140 series would be unimodal, i.e., their respective distribution function will have a single peak, centered around their mean. Since all the score series will adhere to this property, the method computes the mean 141 of all the dimensions and produces a mean vector (of dimension N) for all the score series across all KPIs. With respect to method 300, this corresponds to step 302. where said step of applying vector geometry to said time-series expectation scores comprises calculating a mean and a variance for each said expectation score time-series for each said KPI of said set of multiple KPIs, and performing said calculating across said set of multiple KPIs to produce said N-Dimensional probability vector 147 from said mean of each said KPI, where N=M×E.

Figure 5A:
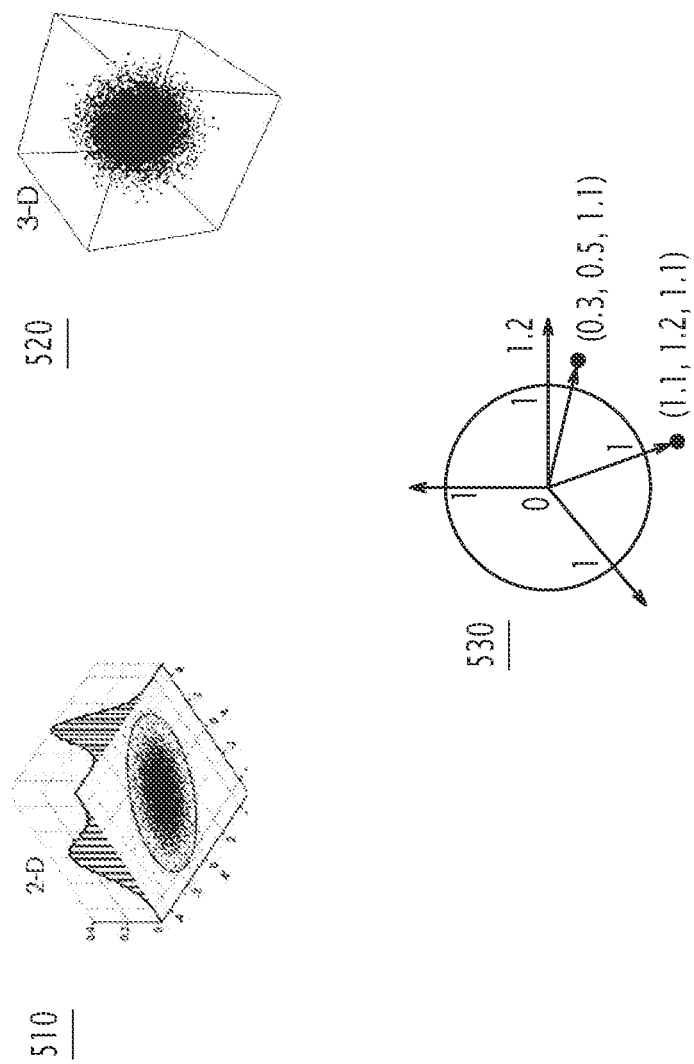
FIG. 5A illustrates statistical projections in multiple dimensions.

Geometrically this means the mean vector (i.e., the N-Dimensional probability vector 147) is a N dimensional point in the high dimensional space. Method step 302 then computes the (N×N) covariance matrix 143 by computing the variance of all the score series along with the cross-correlations between each of them. The covariance matrix 143 is a diagonal matrix where the diagonal terms are the variances for each series. The cross-correlations occur outside the diagonal of the covariance matrix. In the simplistic/unique case where the time-series scores are all statistically independent from one another the cross correlation terms would be zero. Although this doesn't occur in practice, a purely diagonal covariance matrix with zero cross correlation terms provides a good conceptual model for 3D visualization. Accordingly, as an example, to simplify matters for didactic purposes herein, one may assume all score series have same variance. Then in such a case, the expected region of all series combined would be within the N-Dimensional sphere (e.g., 530 FIG. 5A) centered at the mean vector (i.e., the N-Dimensional probability vector 147), with radius determined by the variance. Briefly, FIG. 5A illustrates statistical projections in multiple dimensions. Plot 510 illustrates a projection of two probability vectors (X, Y) onto a 2D surface. Plot 520 illustrates a projection of three probability vectors (X, Y, Z) onto a 3D surface. As the number of dimensions increases it is understandably not possible to visualize in 3D space. However, Plot 530 provides an alternate means for conceptually visualizing the projection into higher dimensions. Here, the center of the sphere (0,0,0) could be a point in an N-dimensional space with a center equal to the mean value component 140 of the N-probability vector.

In this exemplary case, to determine whether the current score from all time-series is as per expectation or not, one needs to evaluate whether the new vector is inside the sphere or outside the sphere. (This example is a sphere because all the cross-correlation terms in the covariance are zero). Where cross-correlation terms are non-zero, this distorts the sphere and produces a non-spherical object (e.g. ellipsoid, non-Euclidean hyper ellipsoid, etc.). The benefit of restricting the projection space to a spherical representation in multi-dimensional space is that one can take care of the correlation problem that occurs when dealing them statistically. In statistics, average represents majority view, while min/max only represents few KPIs at lower or upper end. In the vector case, if few scores are going out of expectation range or if majority are going out of expected ranges. Then in both cases vectors will be outside N-dimensional sphere, only direction of vector will vary as per number of scores involved. For example, in a 3-dimensional (x, y, z axis) sphere of radius 1, the vector (0.1, 0.1, 1.1) will be outside sphere from z-axis. While vector (1.1, 1.1, 1.1) will also be outside sphere but along the diagonal that is at 45° to all 3 axes.

Figure 5B:
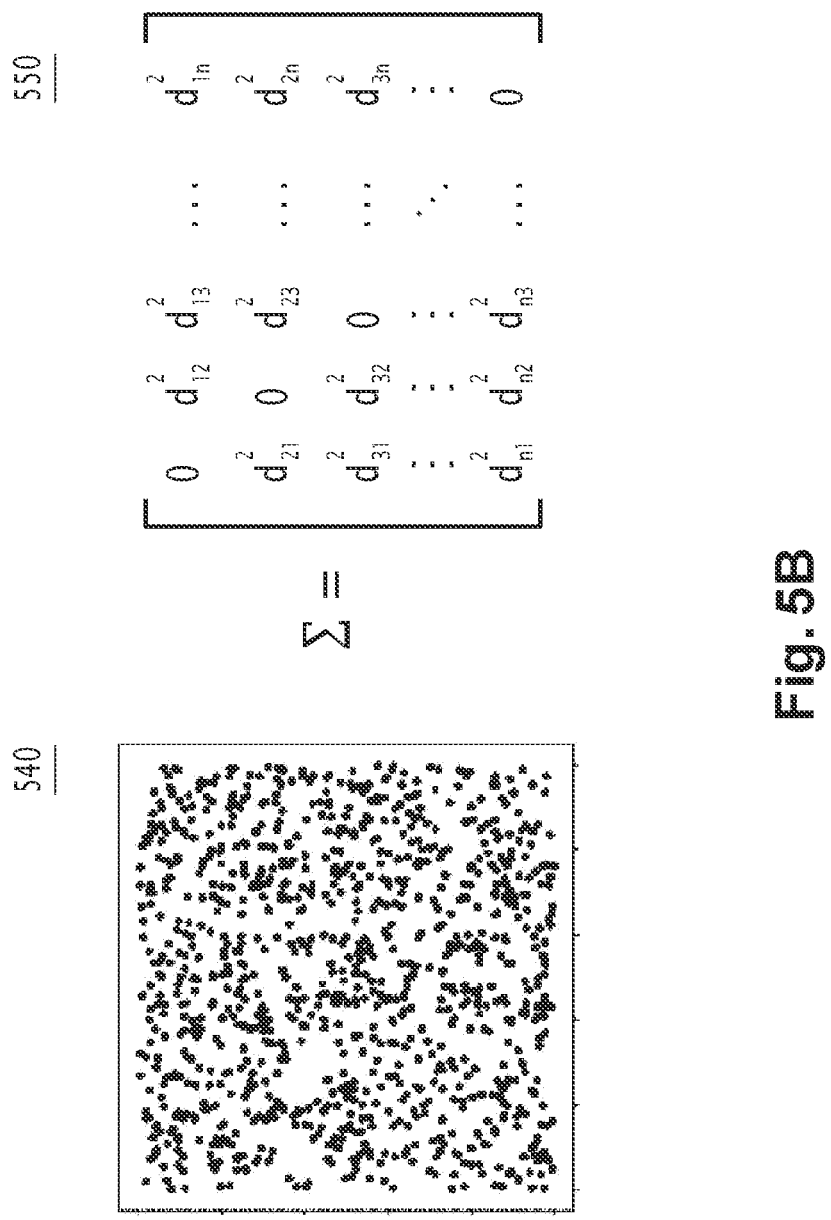
FIG. 5B illustrates an exemplary scatter table and covariance matrix.

Continuing with method 300, at step 303 correlations of the N-Dimensional probability vector 147 are normalized across the set of KPIs thereby producing a normalized N-Dimensional probability vector. To do this, the covariance matrix of size (N×N) is first computed from the plurality of expectation score time-series 121 and is thereafter normalized. The normalization is the step of using a Mahalanobis distance (MD) instead of a Euclidean distance to account for multi-variate data distributions of the N-Dimensional probability vector 147. The Mahalanobis distance equation is provided below, where X is an unseen data vector, for example, to be evaluated within the conceptual multi-dimensional sphere; it is the mean vector resulting from "other" time-series data input into the signal processing system shown in FIG. 4:

$$MD = \sqrt{(X-\mu)^T \Sigma^{-1} (X-\mu)}$$

Where X and μ (147) are N dimensional vectors
Where Σ (143) is the (N×N) dimensional covariance matrix FIG. 5B illustrates an exemplary scatter table 540 and resulting distance matrix 550 for understanding the need for the aforementioned normalization and how it de-skews distributions. The diagonal of a distance matrix has all zeros as distance to self is zero. The covariance matrix (Σ) will be a N×N matrix build using each N-Dimensional point. As with covariance matrix (Σ) 143, the diagonal terms of 550 are the variances for each series. The cross-correlations occur outside the diagonal of the covariance matrix. In the foregoing example, the distance matrix will be computed for each newly added dimension (2 to 7) to illustrate statistical outcomes observed; for instance, the distribution shape, skew, mean, and std. dev. resulting from the increased dimensions. Briefly, consider two-dimensional uncorrelated data (X, Y) as a basis and then adding in noise as the number of dimensions is increased from 2 to 7; thereby adding correlated dimensions:

By adding 1% noise (ε) to X and repeating
3-D data: (X, Y, X+ε)
4-D data: (X, Y, X+ε, X+ε)

5-D data: (X, Y, X+ϵ, X+ϵ, X+ϵ)
6-D data: (X, Y, X+ϵ, X+ϵ, X+ϵ, X+ϵ)
7-D data: (X, Y, X+ϵ, X+ϵ, X+ϵ, X+ϵ, X+ϵ)

Figure 6A:
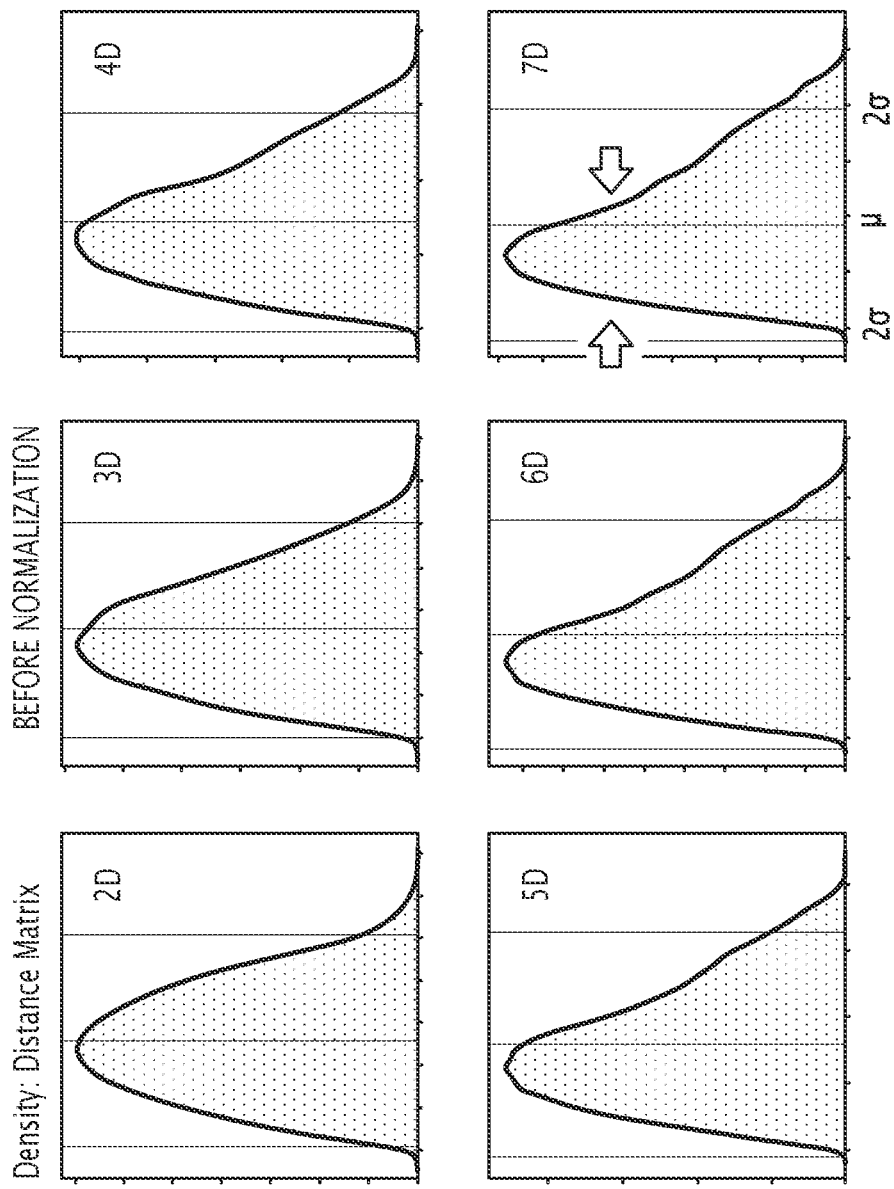
FIG. 6A depicts probability density functions from two to seven dimensions resulting from application of a Euclidean distance to correlations before normalization.

FIG. 6A depicts the resulting probability density functions from two to seven dimensions resulting from application of a Euclidean distance without any normalization for correlation. The effect of correlated features using a Euclidean distance confirms distances are more far apart and spreading away as dimensions increase. The statistic metric of standard deviation is increasing with each newly added dimension. As can be seen, the distribution shape is asymmetric, the mean does not correspond to the peak, and the variances are larger and asymmetric as the dimensionality increases. This figure illustrates the second problem where statistical measures gives a biased summary when score series are correlated to each other. This problem also affects the above handling of scores via vector geometry, as correlation affects the geometry of the space. Without going into many details of data geometry, the short reason for incorrect vector lengths will be that the usual Euclidean distance assumes all axes to be equally important. In case of correlated series all axes should not be considered equally important as they are not independent.

Figure 6B:
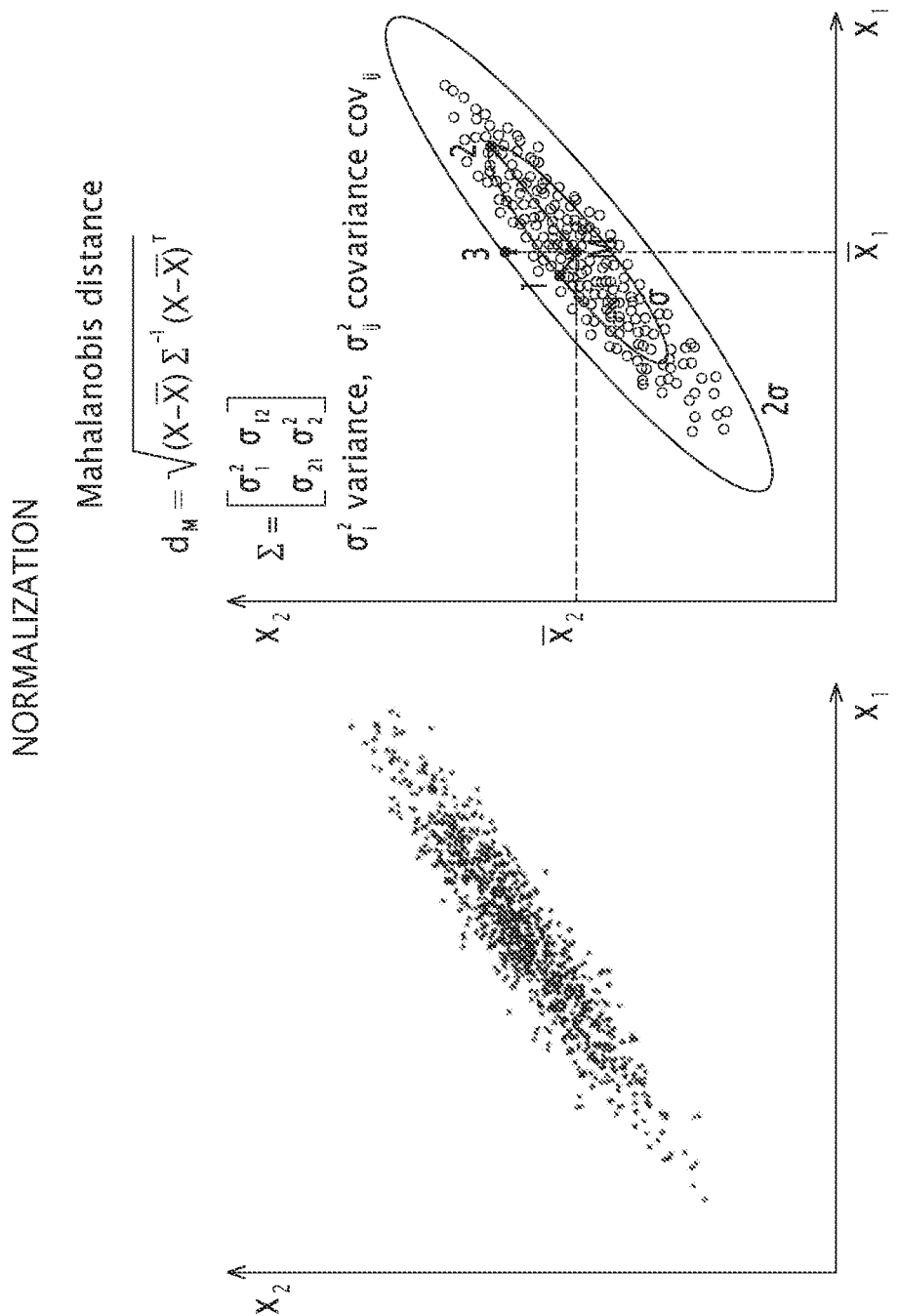
Figure 6C:
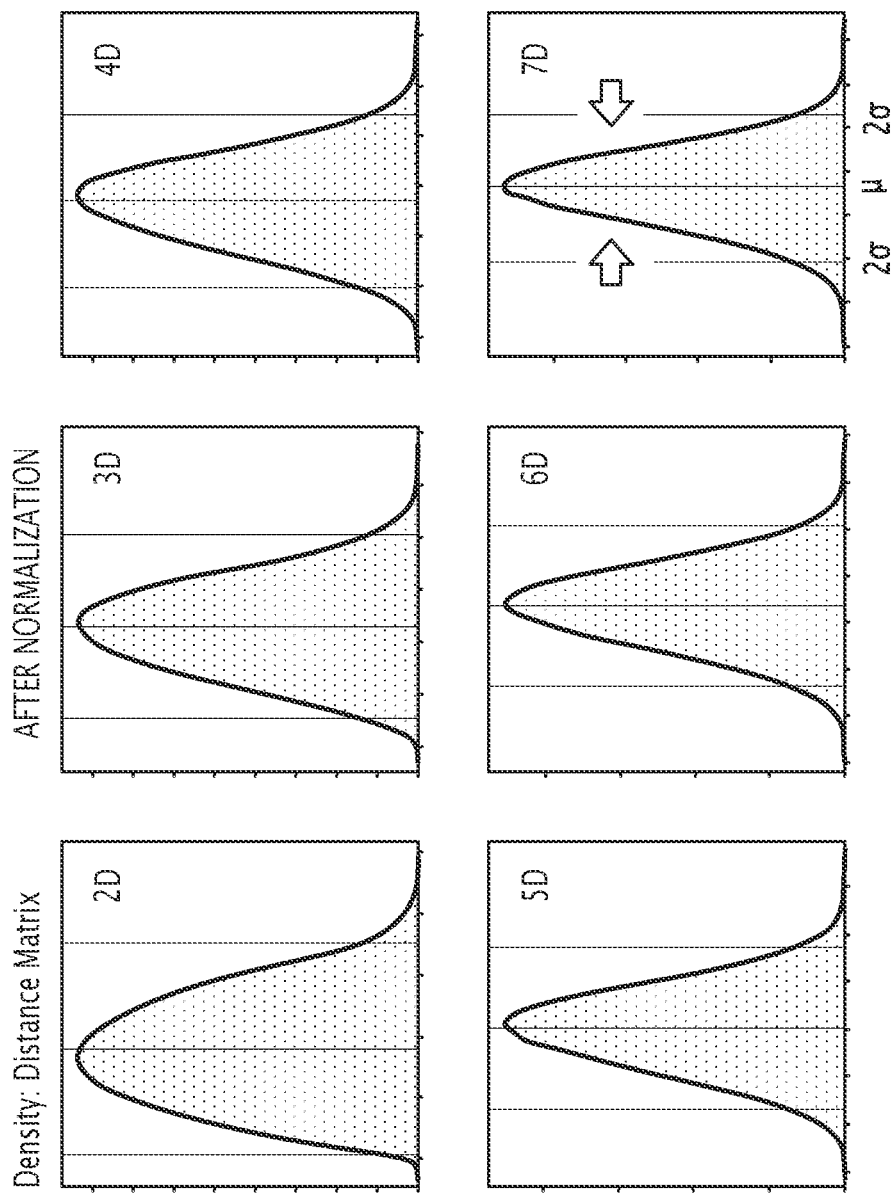
FIG. 6C depicts probability density functions from two to seven dimensions resulting from application of a Mahalanobis distance to correlations after normalization.
Figure 6D:
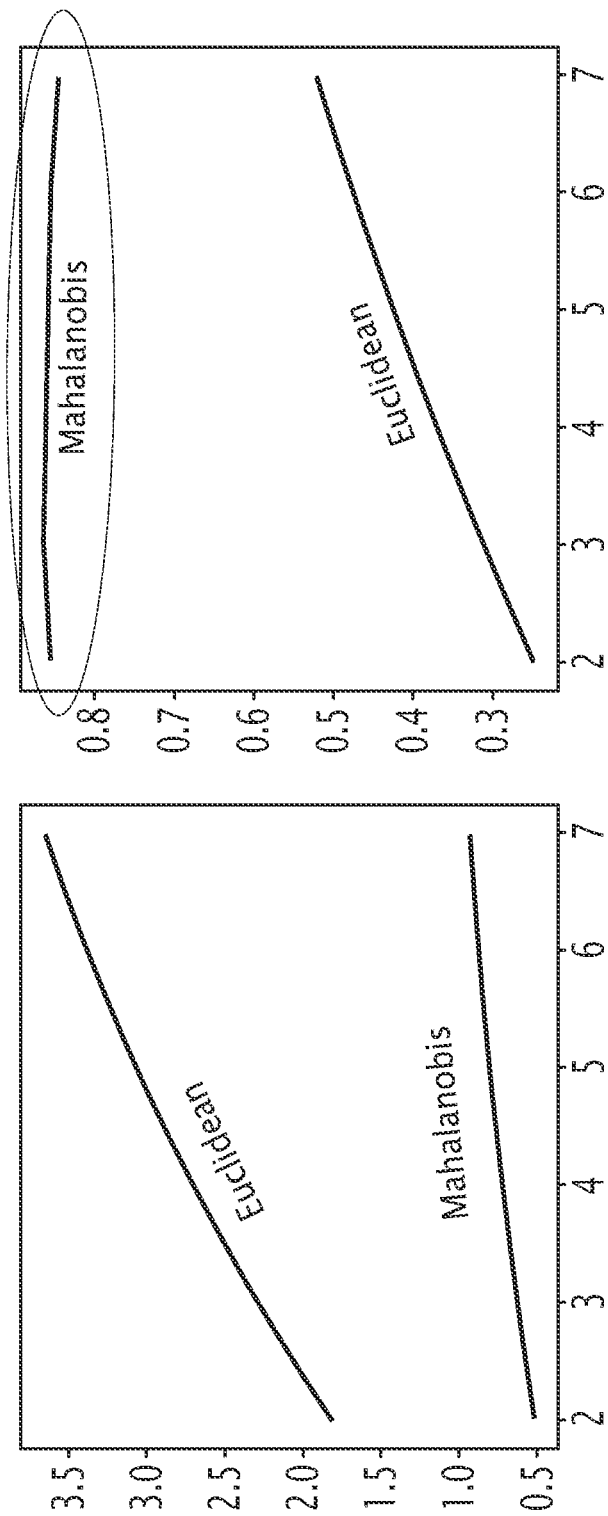
FIG. 6D comparatively graphs a Euclidean distance and Mahalanobis distance across multiple dimensions to illustrate how a standard deviation using Mahalanobis is less effected by correlated feature.
Figure 6E:
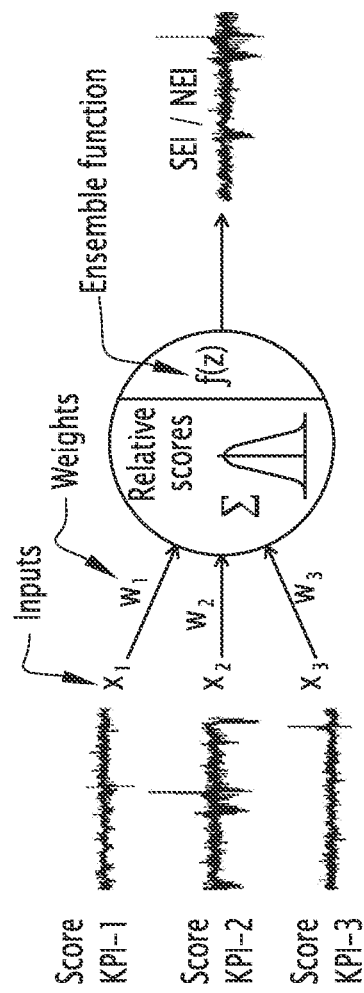
FIG. 6E depicts an ensemble function filter for processing time-series KPI scores into an ensemble index in accordance with an embodiment.
Figure 6F:
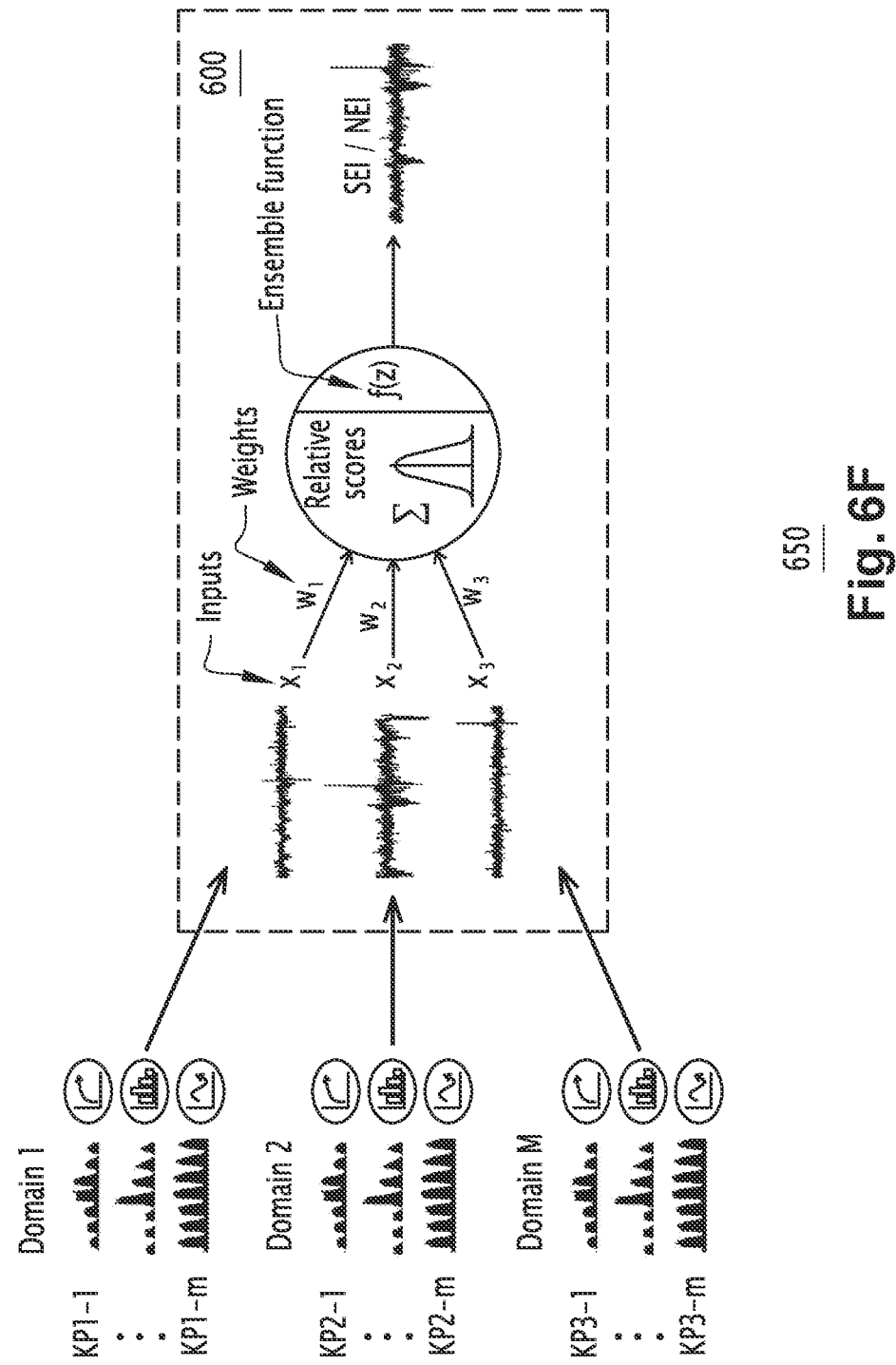
FIG. 6F depicts a system for processing other time-series KPI scores into an ensemble index in accordance with an embodiment.

To solve this problem, Mahalanobis distance was employed (as a normalization) to factor in the correlation amongst various axis before computing distances. FIG. 6B depicts a projection of two distributions and corresponding discriminant boundaries for visualizing distances there between as an example. The normalization function here is Mahalanobis distance, which is an effective multivariate distance metric that measures the distance between a point and a distribution. It is a multi-dimensional generalization of the idea of measuring how many standard deviations away P is from the mean of D. The Mahalanobis distance is unit less, scale-invariant, and takes into account the correlations of the data set. FIG. 6C depicts probability density functions from two to seven dimensions resulting from application of a Mahalanobis distance to correlations after normalization. As can be seen here, the distribution shape is symmetric, the mean corresponds to the peak, and the variances are smaller and symmetric. FIG. 6D comparatively graphs a Euclidean distance and Mahalanobis distance across multiple dimensions to illustrate how a standard deviation using Mahalanobis is less effected by correlated features.

Continuing with method 300, step 304 generating a N-Dimensional probability distribution from the normalized N-Dimensional probability vector to produce an ensemble function. This step incorporates Mahalanobis distance in a Gaussian kernel to produce the ensemble function. The ensemble function is PDF (Probability Density Function) modelled as Gaussian density:

$$PDF(X) = \frac{1}{\sqrt{(2\pi)^N |\Sigma|}} e^{-\frac{1}{2}(MD)^2}$$

The ensemble value represents the unbiased, multi-variate deviation of a vector X from its mean vector μ, where X and y in turn are composed of normalized Z-Scores from various AD algorithms. The Gaussian distribution generates p-values using the Mahalanobis distance computed above, which represent the probability of the mean vector within the N-dimensional sphere (recall FIG. 5B 530) centered at the mean vector. The negative log of this p-value is the final ensemble index used to represent the expectation deviation across all KPIs, incorporating all kinds of statistical expectations. The step 305 of applying the ensemble function to said other time-series data comprises weighting the other time-series data by the ensemble function thereby generating (probability) p-values, applying a negative log operation to the p-value to produce said ensemble index representing said QoE index, and presenting the ensemble index. The ensemble index represents an expectation deviation across all KPIs that incorporates specific statistical properties of said statistical expectation functions.

FIG. 7 depicts an exemplary diagrammatic representation of a machine 700 in the form of a computer system 700 within which a set of instructions, when executed, may cause the machine to perform any one or more of the method steps of method 300 discussed above As an example, the method 300 can be practiced by the server 110 that incorporates aspects of the machine 700. In some embodiments, the machine may operate in part as a standalone device, such as a computer, laptop, or mobile device connected to a telecom network. In some embodiments, the machine may be connected (e.g., using the telecom network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a mobile device, a cell phone, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display or LCD), a flat panel, a solid state display, or a cathode ray tube (CRT)). The computer system 700 may include an input device 712 (e.g., a keyboard, touchless sensing unit 110), a cursor control device 714 (e.g., a mouse, touchless sensing unit 110), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Other Embodiments & Ops-IQ SEA

By way of the machine 700, the method 300 is performed by a processor executing computer instructions thereon from a memory thereto coupled to the machine to provide telecom operators a single Quality of Experience (QoE) index. The index provides the operators a means to collectively interpret service experience and network experience by way of ensemble of expectation scores. Where upon, collecting time-series data for multiple Key Performance Indicators (KPIs), the machine performs the method steps comprising: applying multiple statistical expectation functions to each said time-series data of a KPI from a set of the multiple KPIs thereby producing an expectation score time-series for each statistical expectation function of said KPI; calculating a mean and a variance for each said expectation score time-series associated with said KPI for the set of multiple KPIs; and producing a N-Dimensional probability vector from said means representing the set of multiple KPIs, where N=M (number of KPIs)×E (number of expectation functions). The machine performs the method steps of computing a covariance matrix of size (N×N) from said plurality of expectation score time-series and said variances; calculating a Mahalanobis distance using said N-Dimensional probability vector and said covariance matrix; and generating a N-Dimensional probability distribution that incorporates said Mahalanobis distance in a Gaussian kernel to produce said ensemble function.

Using other time series data collected for multiple Key Performance Indicators (KPIs), the machine preforms the steps of weighting the other time-series data by the ensemble function thereby generating (probability) p-values; applying a negative log operation to the p-value to produce said ensemble index representing said QoE index; and presenting the ensemble index. The weighting includes a matrix multiplication of the other time-series data by the covariance matrix. The time-series data is particular to a KPI, wherein a KPI is particular to a domain, said domain being at least one among Service, Customer Segment, Subscriber and Flow. The time-series data comprises any one or more of tonnage data, flow data, subscriber data, data throughput data, concurrency data, periodicity data, variance data duration data, or diversity data.

Implementation of method 300 provides a machine learning environment whereby the ensemble index can combine and summarize all the input KPIs along with their multiple expectation functions. The approach of method 300 creates a single index representing all the available and trending network issues in the right proportion. Firstly, the complexity handling capability, where a single index can highlight both subtle issues affecting a few KPIs and at the same time also able to address major KPI issues. Secondly, the capability to rectify correlation issues. KPIs seen in real world are always correlated to some extent, and if they are not rectified, then they present a biased view towards the correlated group. The popularly used statistical aggregations-based approaches cannot summaries KPIs in such right proportions. So, technically it will get much easier to monitor and diagnose a large network for telecom operators to address a wide variety of issues. Then further the explanation module that comes along with the ensemble index, also explains the possible cause of unexpected behavior of index in order of their importance. Thus, it would get much easier for a Network Operations Control center analyst to detect issues early and diagnose them to actionable tasks.

The Ops-IQ Service Experience Analytics (SEA) platform is on exemplary embodiment of method 300 in a machine 700. It is an Artificial Intelligence (AI)-augmented proactive assurance solution for Communications Service Providers (CSPs) that focuses on maximizing customer value while optimizing their network costs. It is a Customer experience (CX) "first" approach (CX-first) designed for Network, Service & Care Operations teams to provide real-time indicators of the service experience within active customer micro-segments to proactively address CX-impacting network problems and prevent network-related churn. The Ops-IQ SEA platform provides granular, real-time visibility and control across the full extent of the network including apps and services running over are key to create a tightly integrated layer of services and node connectivity to ensure quality of experience (QoE) and quality of service (QoS).

The Ops-IQ SEA platform incorporates a CX-first unique approach into CSP operations. SEA's includes an "outside-in" approach measures 'service experience' within granular customer micro-segments, presented as a real-time Service Experience Index (SEI). In addition, SEA's "inside-out" approach measures a service's 'network experience' within those same granular customer micro-segments, presented as a real-time Network Experience Index (NEI). Ops-IQ Service Experience Analytics (SEA) provides Communications Service Providers (CSPs) the ability to look at real-time indicators of service experience, within active customer micro-segments, and identify the root cause of emerging Customer Experience (CX)-impacting network problems, thus enabling a proactive problem resolution. By way of method 300, it enables network, service and care operations to proactively address CX-impacting network problems and prevent network-related churn by: 1) Identify critical operational metrics assuring service quality-of-experience (QoE) and customer experience (CX) 2) Foresee network faults, and 3) Predict service degradation. Implementation of method 300 allows telecom operations team can catch network issues early. The presentation of the ensemble index helps them detect issues over a large network, where current methods and means require a considerably larger investment of time and resources Thus, it will translate in huge operations cost saving that occurs during diagnosing a network crisis across a very large network. This would also imply their customers would be more satisfied, as issues would be resolved sooner. Thus, reducing the operational cost along with increasing their brand value.

Further Definitions

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Scheme, Go, C++, C#, VB.NET, Python or the like, conventional procedural programming languages, such as the "C" programming language, Perl, PHP, dynamic programming languages such as Python, Ruby and Groovy, or other programming languages. The program code may execute entirely on the user's computer, partly on the user's computer, as a stand-alone software package, partly on the user's computer and partly on a remote computer, entirely on the remote computer or server, or within the Cloud or other computer network. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS), Backend as a Service (BaaS) for connecting mobile apps to cloud based services, and Security as a Service (SECaas).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed, is:

1. A method for providing telecom operators a single Quality of Experience (QoE) index to collectively interpret service experience and network experience by way of ensemble of expectation scores, the method comprising the steps of:
   mapping Key Performance Indicators (KPIs) of time-series data into multiple probability spaces of statistical expectation functions thereby producing time-series expectation scores;
   applying vector geometry to said time-series expectation scores for each of said statistical expectation functions thereby producing an N-Dimensional probability vector;
   normalizing correlations of said N-Dimensional probability vector across said KPIs thereby producing a normalized N-Dimensional probability vector;
   generating a N-Dimensional probability distribution from the normalized N-Dimensional probability vector to produce an ensemble function; and
   applying the ensemble function to other time-series data thereby producing an ensemble index.

2. The method of claim 1, wherein a time-series data is particular to a KPI, wherein a KPI is particular to a domain, said domain being at least one among service, customer segment, subscriber and flow.

3. The method of claim 2, where said time-series data comprises any one or more of tonnage data, flow data, subscriber data, data throughput data, concurrency data, periodicity data, variance data duration data, or diversity data.

4. The method of claim 3, where said step of mapping Key Performance Indicators (KPIs) comprises:
   applying at least one said statistical expectation function to said time-series data thereby producing an expectation score time-series for each said KPI,
   where said statistical expectation function comprise one among a threshold, a relative spike, a level shift, a volatility shift, a seasonal shift, a trend, a seasonal variance and a forecast.

5. The method of claim 4, wherein said expectation score time-series is bounded from zero to a positive number, where a zero score represents a value that is closest to an expected value and a higher positive number represents a magnitude of deviation from the expected value.

6. The method of claim 4, wherein said step of applying at least one said statistical expectation function produces a plurality of expectation score time-series for a set of multiple KPIs, wherein
   said plurality of expectation score time-series is dimension E;

said set of multiple KPIs is dimension M; and said expectation score time-series comprises scalar terms.

7. The method of claim 6, where said step of applying vector geometry to said time-series expectation scores comprises:
calculating a mean and a variance for each said expectation score time-series for each said KPI of said set of multiple KPIs;
performing said calculating across said set of multiple KPIs to produce said N Dimensional probability vector from said mean of each said KPI, where N=M×E.

8. The method of claim 7, wherein said step of normalizing correlations of said N-Dimensional probability vector comprises:
computing a covariance matrix of size (N×N) from said plurality of expectation score time-series,
wherein said normalizing correlations employs a Mahalanobis distance instead of a Euclidean distance to account for multi-variate data distributions of the N-Dimensional probability vector.

9. The method of claim 8, wherein said variances occur along a diagonal of said covariance matrix, and cross-correlation occur outside said diagonal of said covariance matrix.

10. The method of claim 9, wherein said step of generating a N-Dimensional probability distribution comprises incorporating Mahalanobis distance in a Gaussian kernel to produce said ensemble function.

11. The method of claim 10, wherein said step of applying the ensemble function to said other time-series data comprises:
weighting the other time-series data by the ensemble function thereby generating (probability) p-values;
applying a negative log operation to the p-value to produce said ensemble index representing said QoE index; and
presenting the ensemble index.

12. The method of claim 11, wherein the ensemble index represents an expectation deviation across all KPIs that incorporates specific statistical properties of said statistical expectation functions.

13. A method for providing telecom operators a single Quality of Experience (QoE) index to collectively interpret service experience and network experience by way of ensemble of expectation scores,
where upon, collecting time-series data for multiple Key Performance Indicators (KPIs), the method comprising the steps of:
applying multiple statistical expectation functions to each said time-series data of a KPI from a set of the multiple KPIs thereby producing an expectation score time-series for each statistical expectation function of said KPI;
calculating a mean and a variance for each said expectation score time-series associated with said KPI for the set of multiple KPIs;
producing a N-Dimensional probability vector from said means representing the set of multiple KPIs,
where $N=M$(number of KPIs)$\times E$(number of expectation functions);
computing a covariance matrix of size (N×N) from said plurality of expectation score time-series and said variances;
calculating a Mahalanobis distance using said N-Dimensional probability vector and said covariance matrix;
generating a N-Dimensional probability distribution that incorporates said Mahalanobis distance in a Gaussian kernel to produce said ensemble function.

14. The method of claim 13,
where upon, collecting other time-series data for multiple Key Performance Indicators (KPIs),
the method further comprises the steps of:
weighting the other time-series data by the ensemble function thereby generating (probability) p-values;
applying a negative log operation to the p-value to produce said ensemble index representing said QoE index; and
presenting the ensemble index.

15. The method of claim 13, wherein the weighting includes a matrix multiplication of the other time-series data by the covariance matrix.

16. The method of claim 13, wherein time-series data is particular to a KPI, wherein a KPI is particular to a domain, said domain being at least one among Service, Customer Segment, Subscriber and Flow.

17. The method of claim 16, where time-series data comprises any one or more of tonnage data, flow data, subscriber data, data throughput data, concurrency data, periodicity data, variance data duration data, or diversity data.

* * * * *